No. 831,053. PATENTED SEPT. 18, 1906.
W. GADD.
GAS HOLDER.
APPLICATION FILED DEC. 27, 1905.
2 SHEETS—SHEET 1.
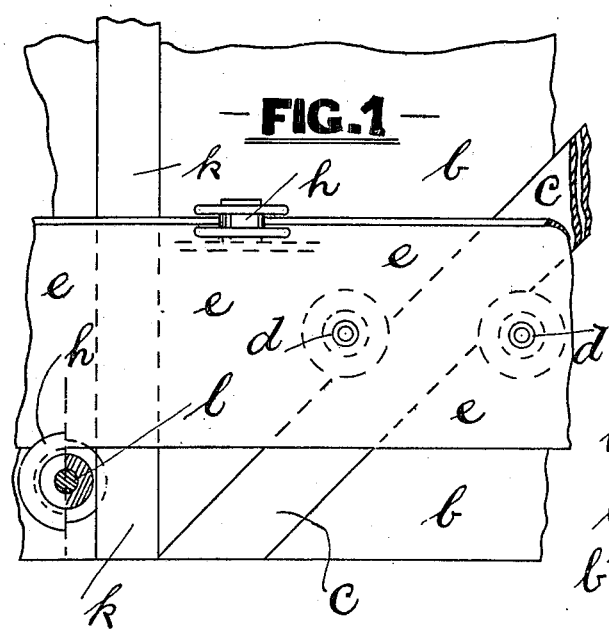
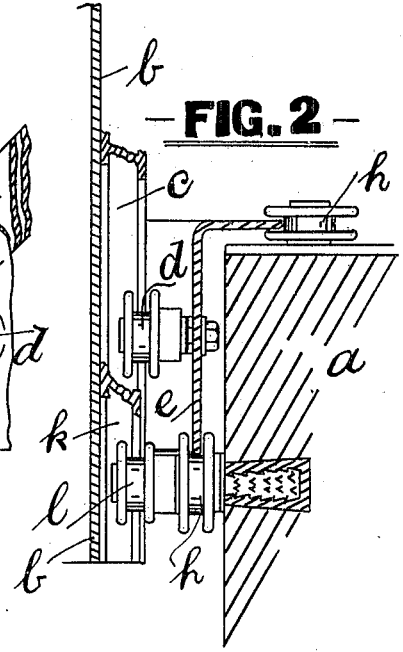
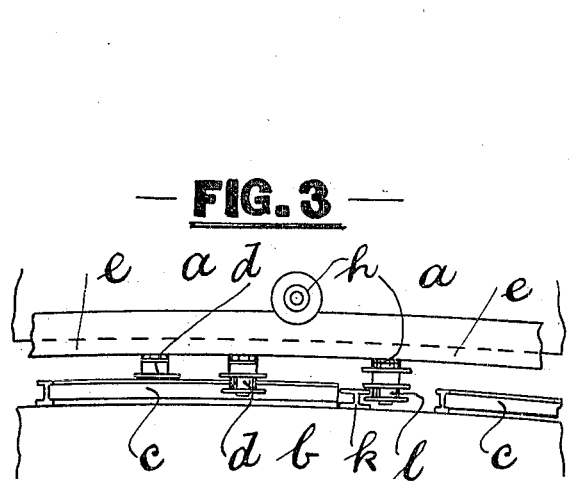
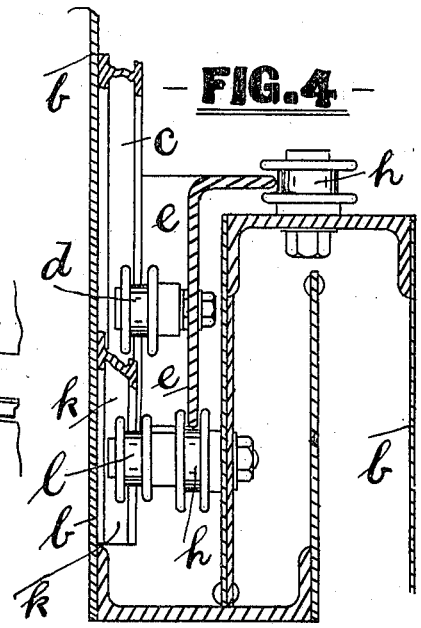
Witnesses
Arthur Gadd.
George Frederick Gadd.
Inventor
William Gadd.

No. 831,053. PATENTED SEPT. 18, 1906.
W. GADD.
GAS HOLDER.
APPLICATION FILED DEC. 27, 1905.
2 SHEETS—SHEET 2.
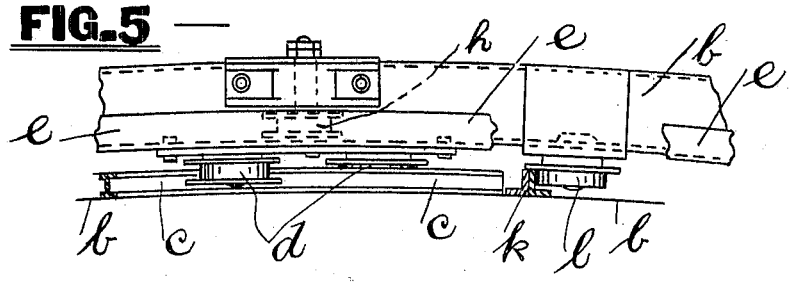
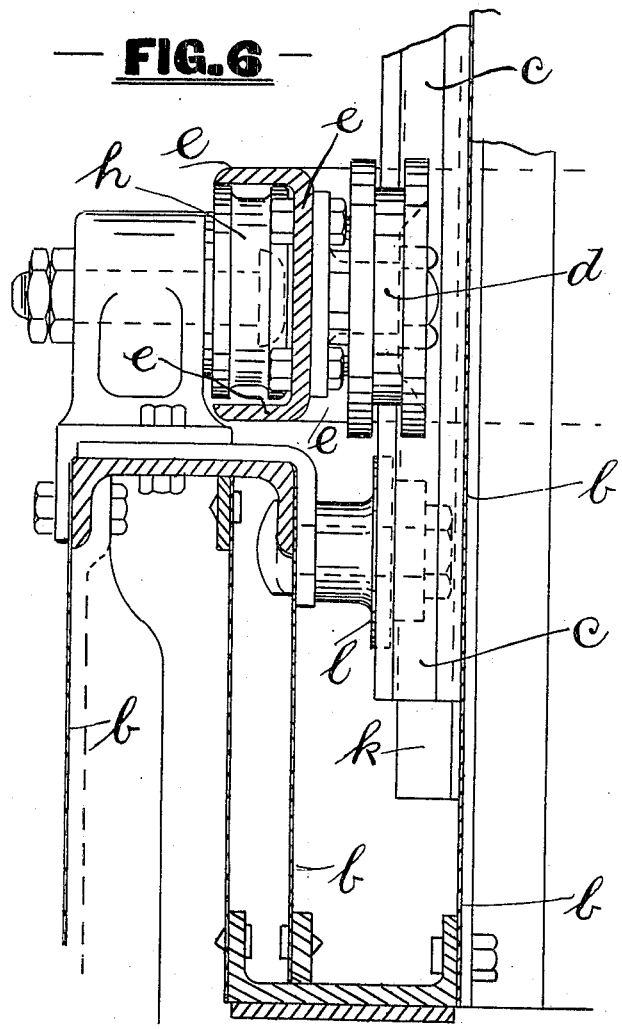
Witnesses.
George Frederick Gadd.
Arthur Gadd.
Inventor
William Gadd

UNITED STATES PATENT OFFICE.

WILLIAM GADD, OF MANCHESTER, ENGLAND.

GAS-HOLDER.

No. 831,053.  Specification of Letters Patent.  Patented Sept. 18, 1906.

Application filed December 27, 1905. Serial No. 293,529.

*To all whom it may concern:*

Be it known that I, WILLIAM GADD, a subject of the King of Great Britain, residing at 64 Barton Arcade, Manchester, in the county of Lancaster, England, have invented new and useful Improvements in Columnless Gas-Holders Supported by Helical Guides, (for which I have made application for patent in Great Britain with provisional specification No. 24,899, bearing date December 1, 1905,) of which the following is a specification.

The improvements relate to columnless gas-holders which are supported during their ascent and descent by means of helical guides; and the object of the invention is to give to gas-holders of this description a vertical rise and fall in lieu of the screw-like or helical motion, which has hitherto been obtained with gas-holders of the character aforesaid. To accomplish this and to effect my improvements, the helical guides may be fixed to the vertical surface of the gas-holder bell in manner similar to that which has heretofore, for the most part, been arranged; but in addition thereto vertical guides are employed, as many as may be found requisite to prevent the turning movement due to the friction of the helical guides. The present vertical stays may be utilized to form the vertical guides aforesaid when desirable.

The guide-rollers into which the helical guides take instead of being arranged as fixtures or resistance-points, as heretofore, are attached to a ring or band of suitable formation capable of moving horizontally around the circle in such manner that as the holder rises and falls vertically the helical guides give a horizontal circular motion to such ring instead of a helical motion to the holder itself. Nevertheless this ring, traveling horizontally in suitable bearings or supports, firmly and securely grips or holds the holder at all heights, and yet enables the holder to rise and fall vertically, thus obviating any inconvenience which in some cases may possibly ensue from the screw-like or helical rise and fall at present characteristic of this class of gas-holder; but that the invention may be better understood I will, with the aid of the accompanying drawings, proceed to more fully describe means employed by me.

Figure 1 is a view in elevation (part thereof being shown in section) of a portion of a gas-holder, and Fig. 2 is a sectional elevation of portions of the gas-holder and tank-wall, while Fig. 3 is a plan, on a smaller scale, of the said portions of a gas-holder and tank-wall, all arranged according to one form of my invention. Figs. 4 and 6 are sectional elevations similar to Fig. 2, showing adaptations of the invention to the inner and outer lifts of a telescopic gas-holder, while Fig. 5 is a plan view, on a smaller scale, of Fig. 6.

$a$ represents the wall of the gas-holder tank, which is omitted from Fig. 1 for the sake of clearness, and $b$ is the gas-holder bell, having guide-rails $c$ mounted thereon in helical form.

$d$ represents the rollers for engaging with the rails $c$, which rollers have heretofore been arranged as fixities or resistance-points, but which, in accordance with my present invention, are attached to a ring or band $e$, capable of moving horizontally around the circle. Antifriction-rollers $h$ are in Fig. 2 shown provided upon the tank side and upper surface thereof for supporting the ring or band $e$ and for allowing the same to freely move in a circular path when necessary. The rollers $d$ upon the ring or band $e$ thus firmly and securely grip or hold the holder at all heights of its rise and fall.

$k$ $k$ are vertical guides, as many as may be found requisite, attached to the side of the gas-holder $b$, which take into guide-rollers, such as $l$, mounted on the tank, Fig. 2, or lower lift, Figs. 4 and 6, all for the purpose of preventing the turning movement of the holder due to the friction of the helical rails $c$ and to cause such holder to take a vertical rise and fall.

In Figs. 4 and 6 the vertical guides $k$ and helical rails $c$ are shown attached to the outside of the inner lift of the gas-holder, while the rollers $l$ and $h$ are in connection with the cupping or dip portion of the outer lift of the gas-holder for telescoping purposes.

In operation it will be seen that as the gas-holder rises or falls it is prevented from turning by reason of the vertical guides $k$, engaging with the fixed rollers $l$, but that the inclination of the helical guides $c$, taking into the rollers $d$, will while the holder is in motion impart a circular movement to the band or ring $e$, by which means the holder will be firmly held at all working heights, any tilting of the holder being prevented by reason of the ring $e$, enabling all lateral pressures to be resisted at the gripping-points around the circle.

I claim—

1. In gas-holders, supported by helical guides, the combination therewith of vertical guides and a movable ring arranged around the circle, together with the necessary guide and grip rollers connected therewith, for the purpose of giving a vertical rise and fall to this class of gas-holders, in manner as herein shown and described.

2. In gas-holders supported by helical guides, a ring or band $e$ free to move horizontally about the periphery of the gas-holder bell $b$, guide-rollers $d$ attached to said ring; helical rails $c$ mounted on said bell and taking into said guide-rollers; vertical rails $k$ mounted on said bell, and guide-rollers $l$ mounted on the tank $a$, and taking into the said rails $k$ substantially as set forth.

3. In gas-holders supported by helical guides, a ring or band $e$ free to move horizontally about the periphery of the gas-holder upper lift $b$; guide-rollers $d$ attached to said ring; helical rails $c$ mounted on said upper lift, and taking into said guide-rollers; vertical rails $k$ mounted on said upper lift, and guide-rollers $l$ mounted on the lower lift $b$ and taking into said rails $k$ substantially as set forth.

4. In gas-holders supported by helical guides, a ring or band $e$; antifriction-rollers $h$ supporting said ring; rollers $d$ mounted on said ring; helical rails $c$ mounted on the upper lift or gas-holder bell $b$ and taking into said roller $d$; vertical rails $k$ mounted on said lift or bell, and guide-rollers $l$ mounted on the lower lift $b$ or tank $a$, and taking into said vertical rails $k$ substantially as set forth.

WILLIAM GADD.

Witnesses:
GEORGE FREDERICK GADD,
ARTHUR GADD.